(12) United States Patent
Shields et al.

(10) Patent No.: US 11,745,260 B2
(45) Date of Patent: Sep. 5, 2023

(54) PIN ARRAY SINTERING SUPPORTS

(71) Applicant: Hewlett-Packard Development Company, L.P., Spring, TX (US)

(72) Inventors: James P. Shields, Corvallis, OR (US); David A. Champion, Corvallis, OR (US)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 25 days.

(21) Appl. No.: 15/734,400

(22) PCT Filed: Oct. 30, 2018

(86) PCT No.: PCT/US2018/058147
§ 371 (c)(1),
(2) Date: Dec. 2, 2020

(87) PCT Pub. No.: WO2020/091741
PCT Pub. Date: May 7, 2020

(65) Prior Publication Data
US 2021/0362227 A1 Nov. 25, 2021

(51) Int. Cl.
*B22F 3/00* (2021.01)
*B33Y 40/20* (2020.01)
*B22F 3/10* (2006.01)
*B22F 10/10* (2021.01)
*B22F 10/14* (2021.01)

(52) U.S. Cl.
CPC ............... *B22F 3/003* (2013.01); *B22F 3/10* (2013.01); *B22F 10/10* (2021.01); *B33Y 40/20* (2020.01); *B22F 10/14* (2021.01); *B22F 2003/1042* (2013.01); *B22F 2998/10* (2013.01)

(58) Field of Classification Search
CPC .. B22F 3/003; B22F 3/10; B22F 10/14; B22F 2003/1042; B22F 2998/10; B22F 3/00; B22F 3/005; B33Y 40/20; B28B 7/02; B28B 7/025; B28B 7/06
See application file for complete search history.

(56) References Cited

U.S. PATENT DOCUMENTS

| | | |
|---|---|---|
| 5,846,464 A | 12/1998 | Hoffman |
| 9,130,485 B2 | 9/2015 | Prahlad et al. |
| 9,291,058 B2 | 3/2016 | Simmons et al. |
| 2008/0302500 A1* | 12/2008 | Winkler ............... B29C 33/308 164/45 |
| 2010/0195122 A1 | 8/2010 | Kritchman |
| 2015/0089791 A1 | 4/2015 | Werner, Jr. et al. |
| 2015/0137426 A1* | 5/2015 | Van Esbroeck ........ B33Y 10/00 425/162 |

(Continued)

*Primary Examiner* — Sally A Merkling
*Assistant Examiner* — Ricardo D Morales
(74) *Attorney, Agent, or Firm* — SHOOK, HARDY & BACON L.L.P.

(57) ABSTRACT

Techniques for using a pin array to support a 3D printed object during sintering are disclosed. An example method includes adjusting pins of a pin array to provide support for a bottom surface of the 3D printed object, and placing the 3D printed object on the pin array. The method also includes placing the 3D printed object and pin array in a sintering oven, and heating the 3D printed object in the sintering oven to sinter the 3D printed object while being supported by the pin array.

13 Claims, 9 Drawing Sheets

(56) References Cited

U.S. PATENT DOCUMENTS

2016/0214327 A1    7/2016  Uckelmann et al.
2017/0297111 A1   10/2017  Myerberg et al.
2018/0281305 A1*  10/2018  Fromm .................. B29C 64/20
2018/0281464 A1*  10/2018  Bradway ................ B41J 3/4073
2019/0375006 A1*  12/2019  Barua .................... B22F 10/00

* cited by examiner

PIN ARRAY SINTERING SUPPORTS

CROSS-REFERENCE TO RELATED APPLICATION

Pursuant to 35 U.S.C. § 371, this application is a United States National Stage Application of PCT Patent Application Serial No. PCT/US2018/058147, filed on Oct. 30, 2018, the contents of which are incorporated by reference as if set forth in their entirety herein.

BACKGROUND

Three-dimensional (3D) print technology is a type of additive manufacturing in which successive layers of a build material are deposited, generally with the aid of a computing device. 3D binder jetting printers are a type of 3D printer in which a binder agent is deposited to bind, or hold, particles of a build material together, resulting in the 3D object. The binder agent is printed, or deposited, as droplets or as a stream in a liquid vehicle, in a desired pattern, using a suitable type of liquid jetting technology. The binder agent defines the geometry of the part that is being printed by binding portions of a layer of build material, such as powdered build material particles.

3D binder jetting printers may be used with metal build materials, such as metal powders, to produce bound "green" parts. Green parts may be removed from the printer and processed in a sintering furnace to fuse or sinter the metal powder to produce a generally highly dense metal part.

BRIEF DESCRIPTION OF THE DRAWINGS

The foregoing aspects of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

The present disclosure describes a reusable support device for supporting a 3D printed object during sintering. The support includes a pin array with high melting point pins such as ceramic pins. The pins of the pin array can be adjusted to conform to the bottom surface of the 3D printed object to prevent unwanted deformation of the 3D printed object during the sintering process.

The result of the 3D printing process will be a low density 3D printed object, referred to as a green part. The green part includes a binding agent and a loosely coupled build material, such as metal or ceramic powder. The sintering process will burn off the binding agent and allow the build material to consolidate into a lower density object. Thus, the green part will shrink during the sintering process. In some examples, the pin array may be configured to adjust during the sintering process to conform to the shape of the object as it shrinks. For example, each of the pins may be supported by a spring that allows the pins to rise or fall in response to the shifting weight applied by the object. In another example, the pin array is actively controlled during the sintering process by an array of actuators that adjust each pin separately based on a model of how the object will shrink during the sintering process. In another example, the pin array may be supported from below by a thermally responsive material bed, such as metal powder or ceramic paste. As the material bed is heated and shrinks, the pins will retract and allow the object to settle into its final shape. Features of the present techniques will be better understood with reference to the following figures and description.

Figure 1:
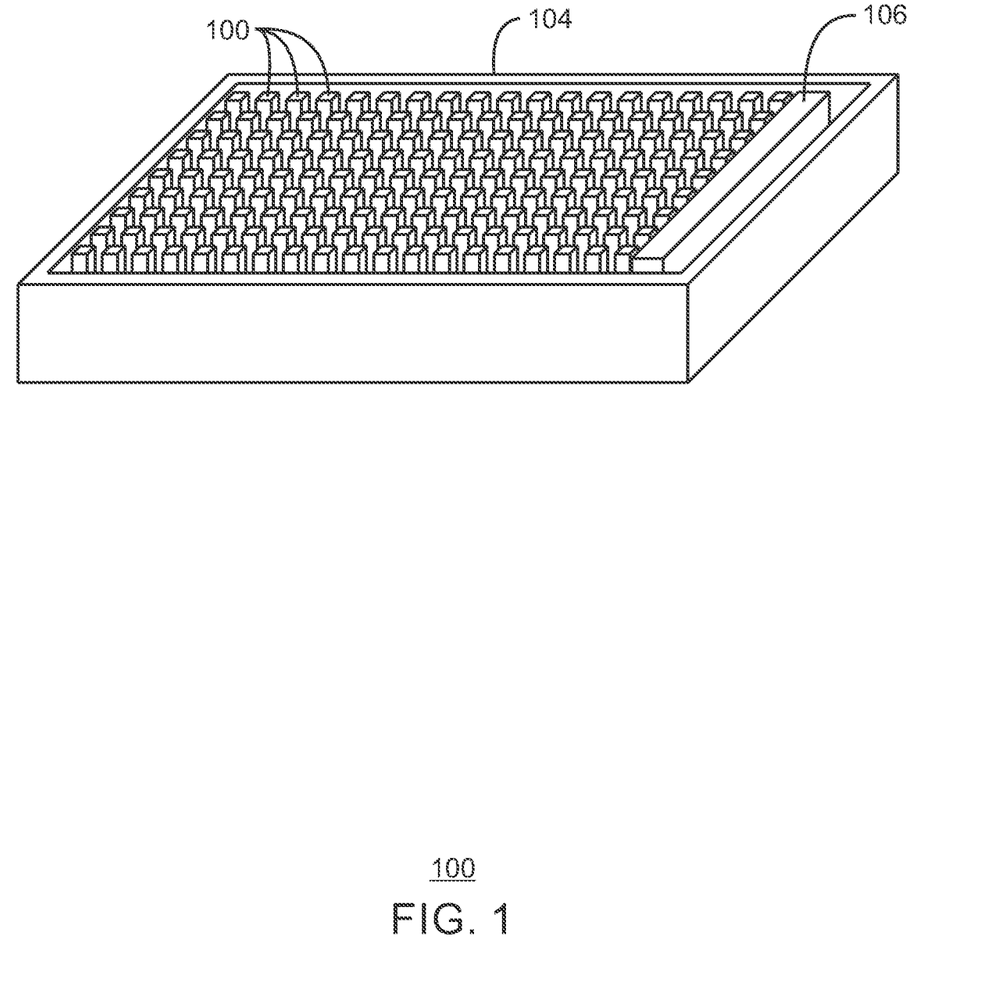
FIG. 1 is a perspective view of an example pin array configured for use as a support structure during sintering of a 3D printed object, according to some examples.

FIG. 1 is a perspective view of an example pin array configured for use as a support structure during sintering of a 3D printed object. In this example, the pin array 100 includes a plurality of closely packed pins 102 contained within an outer frame 104. As used herein, the term closely packed means that the sides of adjacent pins contact one another once they are set in place. The outer frame 104 also includes a locking mechanism 106 that locks the pins 102 in place after the pins are set to the desired contour. Prior to locking the pins in place, the pins may be loosely arranged within the frame, as shown in FIG. 1, which allows the pins to be adjusted. In this example, the locking mechanism 106 is a bar that compresses the pins 102 against each other and against the opposite wall of the frame 104. Other locking mechanisms are also possible.

The pins of the pin array 100 can be set to provide the desired support for the green part during the sintering process. The pins 102 may be adjusted using any number of techniques, which are described further below. In some examples, setting the pins 102 may involve adjusting the pins 102 to conform to the surface of the green part as it exists prior to sintering. In some examples, the pins 102 may be set so that the pins will conform to the final shape of the green part after the green part has shrunk due to sintering. In this example, the pins 102 would be adjusted to a final state position. As the green object shrinks and reaches the final state, it will then be fully supported so that no further deformation can take place.

After the pins 102 are set and locked in place, the pin array 100 may be placed in a sintering furnace with the green part resting on top of the pin array 100. The sintering process is then performed with the pin array 100 in place. After the sintering process is completed, the green part and pin array 100 can be removed. The pin array 100 can then be re-used to sinter additional green parts, either using the current pin configuration or after unlocking the pin array 100 and reconfiguring the pin array 100 into a new contour.

In the example of FIG. 1, the cross sections of the pins 102 are square, which enables the pins to be tightly packed with no space between them. However, other pins shapes may be used, including circular cross sections, hexagonal cross sections, and others. The pins 102 may also be hollow, thin-walled cylinders. The area of the pin array 100 may be sized based on the size of the green part to be supported or may be sized based on the size of the sintering furnace. For example, the pin array may be sized to cover all or nearly all of the area of the sintering furnace. The pin array 100, including the frame 104 and the pins 102, may be made of any suitable high-melting point material, as discussed further in relation to FIG. 2.

Figure 2:
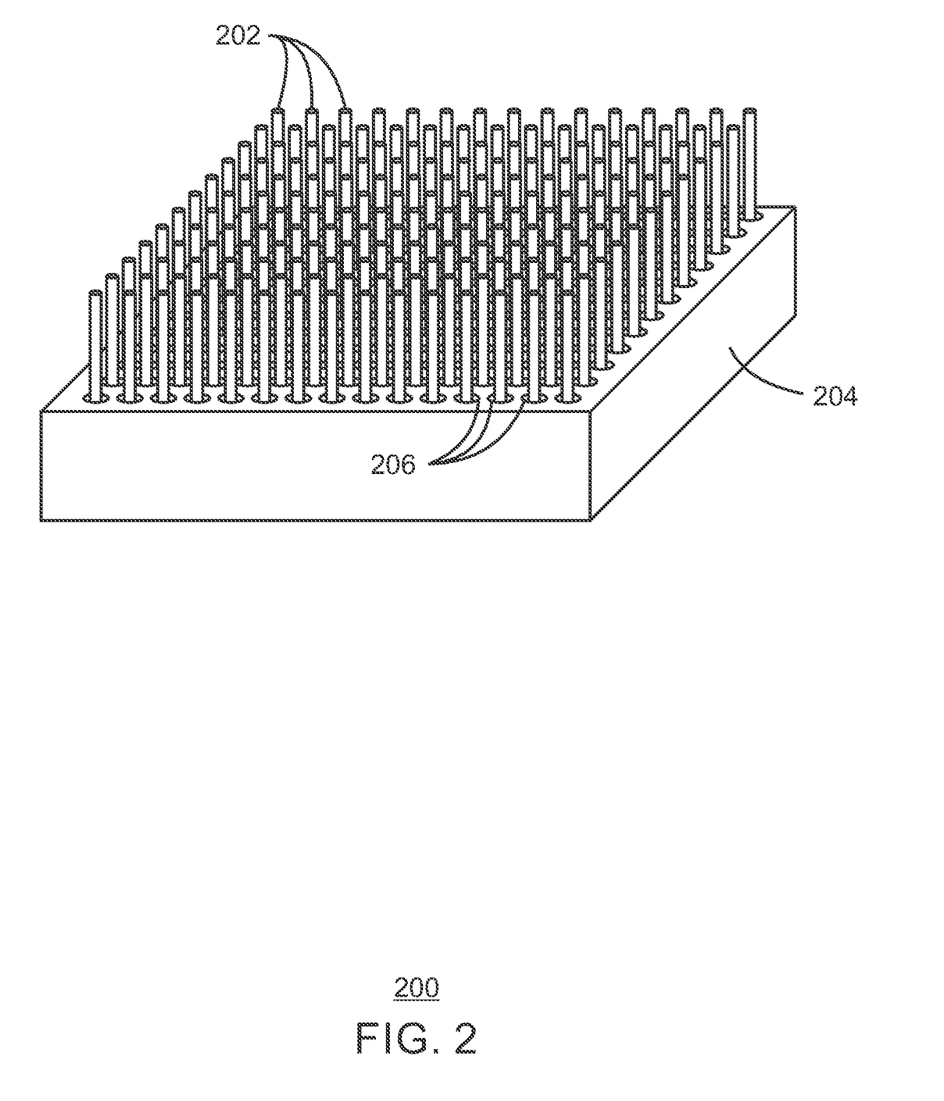
FIG. 2 is a perspective view of another example pin array configured for use as a support structure during sintering of a 3D printed object, according to some examples.

FIG. 2 is a perspective view of another example pin array configured for use as a support structure during sintering of a 3D printed object. In this example, the pin array 200 includes a plurality of pins 202 that are supported by a frame 204 that includes an array of support holes 206, with each pin 202 disposed in one of the support holes 206. Various techniques may be used to support the pins from below, as discussed further below.

The pins 202 shown in FIG. 2 have a circular cross section. However, other pins shapes may be used, including square cross sections, hexagonal cross sections, and others. The pin density can be specified to be sufficient to support a part against sag. In some examples, the gap between the pins 202 may be between 0 to 5 mm. The head of each pin 202 may be shaped to serve various purposes depending on the design considerations of a particular implementation. Examples pin head types are described further in relation to FIG. 5.

The pins 202 of the pin array are set to provide the desired support for the green part during the sintering process. The pins 202 may be adjusted using any number of techniques, which are described further below. In some examples, the pins 202 of the pin array will remain in the same configuration throughout the sintering process. Additionally, the pins 202 may be set to conform to the final shape of the green part after the green part has shrunk due to sintering. In some examples, the pin array 200 includes a locking mechanism, such as the locking mechanism shown in FIG. 3.

In some examples, the pins 202 are able to extend or retract in the support hole 206 during the sintering process to react to the changing shape of the green part as it consolidates and shrinks. Various techniques may be used to move the pins 202 during the sintering process, including the use of springs, active actuators, a thermally responsive support material, and others. In this example, the pins 202 of the pin array 200 may be adjusted to an initial pin setting prior to sintering. The initial pin setting may cause the pins 202 to conform to the surface of the green part as it exists prior to sintering. During the sintering process, the pins 202 will gradually adjust to a new pin setting that provides a continually adjusting support for the green part as it shrinks.

Both of the pin arrays 100 and 200 shown in FIGS. 1 and 2 can be reused for sintering multiple times and can be adjusted to support green parts of various shapes. The sintering process involves heating the green part to a high enough temperature to allow the build material to flow and consolidate. The temperature inside the sintering furnace will be determined based on the type of build material used to generate the green part, and may reach temperatures as high as 1200 to 2000 degrees Centigrade (C). To maintain the structural integrity of the pin array 100/200, the pins 102/202 and the frame 104/204 may be made of a high melting point material, such as ceramic, tungsten carbide, and others. The material used for the pins 102/202 and the frame 104/204 can be decided based on the expected temperature that it will be exposed to during the sintering process. Table 1 below describes a number of materials that may be used at the build material for the green part, while table 2 shows a number of materials that may be used to form the pin array 100/200. The pin array material may be selected such that the pins 102/202 and the frame 104/204 will have a higher melting point than the build material of the green part. It will be appreciated that the list of materials is not exhaustive and that other materials may also be suitable.

TABLE 1

Example Build Materials

| Build Material | Melting Point (Degrees C.) |
| --- | --- |
| Stainless Steel | 1400-1450 |
| Aluminum | 660 |
| Alumina | 2072 |
| Silica | 1713 |
| Aluminum Silicate | |

TABLE 2

Example Pin Array Materials

| Pin Array Material | Melting Point |
| --- | --- |
| Stainless Steel | 1400-1450 |
| Alumina | 2072 |
| Silica | 1713 |
| calcium hexaboride (CaB6) | 2235 |
| Boron Nitride (BN) | 2973 |
| Boron carbide (B4C) | 2763 |
| Tungsten carbide (WC) | 2785 |
| Silicon carbide (SiC) | 2830 |
| Titanium diboride (TiB2) | 3225 |
| Zirconium diboride (ZrB2) | 3246 |
| Zirconium Nitride (ZrN) | 2952 |
| Titanium Nitride (TiN) | 2930 |

Optionally, the support surface of the pin array 100/200 may be coated with a barrier material that prevents the pin array from adhering to the green part during the sintering process. The barrier material may be a high melting point powder such as a ceramic powder or a thin sheet of ceramic paper, for example. Suitable materials for the barrier material include calcium hexaboride (CaB6), borazon (BN), boron carbide (B4C), tungsten carbide (WC), silicon carbide (SiC), titanium diboride (TiB2), zirconium diboride (ZrB2), and others.

Figure 3:
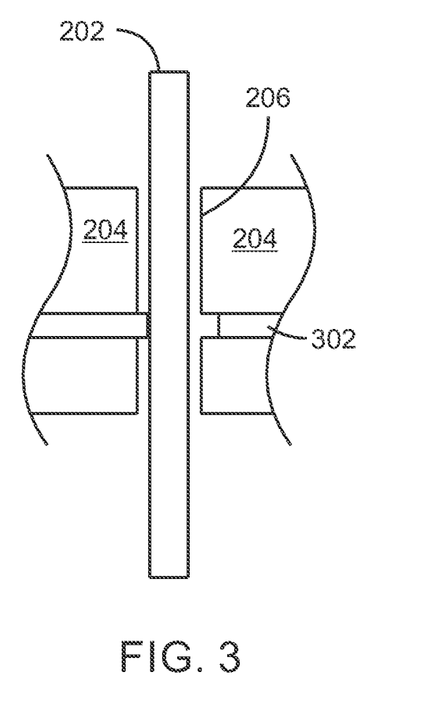
FIG. 3 is a cross sectional view of a portion of the pin array of FIG. 2, according to some examples.

FIG. 3 is a cross sectional view of a portion of the pin array 200. Specifically, FIG. 3 shows one example configuration of a pin 202 and frame 204. In this example, each support hole 206 in the frame 204 is a through hole, which allows the pin 202 to pass completely through. As described further below, the pin 202 may be supported from below by an active actuator, thermally response material, or other type of support structure.

In some examples, the pins 202 of the pin array 200 are not supported from below during the sintering process. For example, the pin array 200 may include a locking mechanism such as the locking plate 302. The locking plate 302 includes a plurality of holes that align with the holes 206 of the pin array 200 to allow free movement of the pins 202. To lock the pins in place, the locking plate 302 can be adjusted to apply pressure to the side of each pin 202, thereby locking the pins 202 against the sidewall of the hole 206. Other locking mechanisms are also possible.

Figure 4:
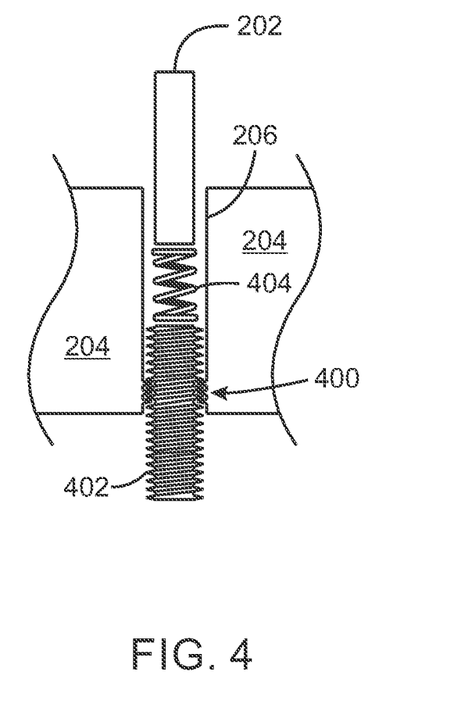
FIG. 4 is a cross sectional view of a portion of the pin array of FIG. 2, according to some examples.

FIG. 4 is a cross sectional view of a portion of the pin array 200. Specifically, FIG. 4 shows one example configuration of a pin 202 and frame 204. In this example, each support hole 206 in the frame 204 is a through hole, which allows the pin 202 to pass completely through. Additionally, the hole 206 also includes a threaded portion 402 configured to receive a threaded rod 402. With this configuration, the pins 202 can be extended or retracted by rotating the threaded rod 402. The threaded rod 402 may be rotated manually or automatically to set the pins prior to sintering. To set the pins automatically, the threaded rod may be mechanically coupled to an actuator such as a stepper motor. In some examples, each pin may be coupled to its own actuator. In this way, the entire pin array may be set to the desired support configuration quickly. In some examples, the actuators may remain coupled to the pin array during the sintering process, and the pins may be adjusted during the sintering process to provide continual adjustment of the support surface, as shown and described more fully in relation to FIG. 10. In some examples, after the pins of the pin array are set in the desired position by the actuators, the pin array can be separated from the actuators and placed in the sintering oven separately.

In some examples, the pin 202 may be supported by a spring 404 that enables passive adjustment of the support surface provided by the pin array during sintering. As the green part shrinks during sintering, the weight of the green part may shift, placing more weight on some pins and less weight on others. The spring allows the pin to extend or retract during the sintering process in response to the shifting weight of the green part. The spring 404 may be made from a high melting point material, such as ceramic, tungsten, tungsten carbide, and others. It will be appreciated that the configuration shown in FIG. 4 may also be used without the inclusion of the spring 404.

Figure 5:
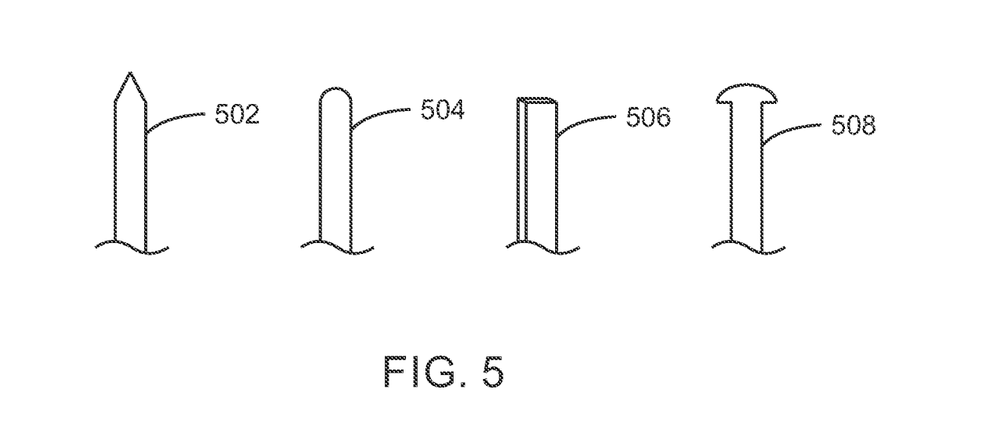
FIG. 5 is an illustration of various pin head types that may be used in the pin arrays, according to some examples.

FIG. 5 is an illustration of various pin head types that may be used in the pin arrays 100 and 200. The pin 502 shows a cylindrical pin with a pointed tip. The pointed tip may be used to reduce the adhesion of the pin array to the green part during sintering. The pin 504 shows a cylindrical pin with a rounded top. The rounded top may be used to reduce friction between the pin array and the green part during sintering. For example, as the green part shrinks during sintering, some portions of the green part may move laterally with respect to the pins in the pin array. The rounded top allows the green part to slide more easily over the surface of the pin 504.

The pin 506 is has a square cross section and flat top. The pin 506 may be useful in a pin array that used closely packed pins, such as the pin array 100 of FIG. 1. The pin 508 is a cylindrical pin with a flared top. The flared top may also be rounded to reduce friction between the pin array and the green part during sintering. The pin 508 may be useful to provide a wider support surface in case the pins are not closely packed as in the pin array 200 of FIG. 2. The wider support surface reduces the size of the gaps between the pins at the head and reduces the likelihood of the green part sagging between unsupported portions.

It will be appreciated that various other pin head types may also be possible, and that the pins shown in FIG. 5 are a small sample of the various types of pin head types that may be used in accordance with the present techniques.

Figure 6:
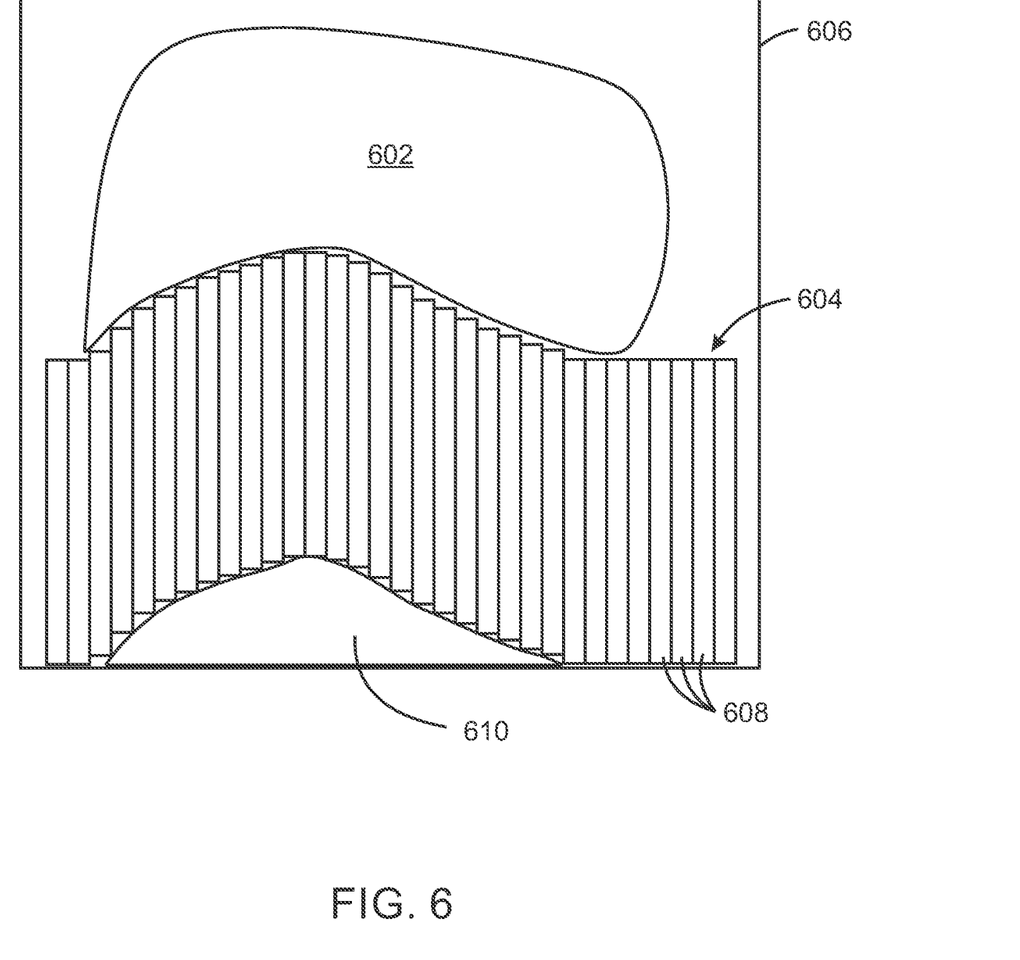
FIG. 6 is an illustration of an example technique for supporting a green part during sintering, according to some examples.

FIG. 6 is an illustration of an example technique for supporting a green part during sintering. FIG. 6 shows a green part 602 supported by a pin array 604 inside of a sintering furnace 606. The pin array 604 may be the same as the pin array 100 shown in FIG. 1 or the pin array 200 shown in FIG. 2. The pin array 604 may also include a frame (not shown) that allows the pins to move freely within the frame or support hole. In this example, the pins 608 of the pin array 604 are held in place by a support structure 610. The support structure 610 may be made of a high melting point material such as ceramic, which maintains its shape during the sintering process. The support structure 610 supports the pins 608 so that the contour of the support surface of the pin array 604 will match the same contour of the support structure 610. The contour of the support structure 610 may be designed to cause the support surface of the pin array 604 to conform to the initial contour of the green part 602 or the contour of final state of the green part 602 after it has been sintered.

Figure 7:
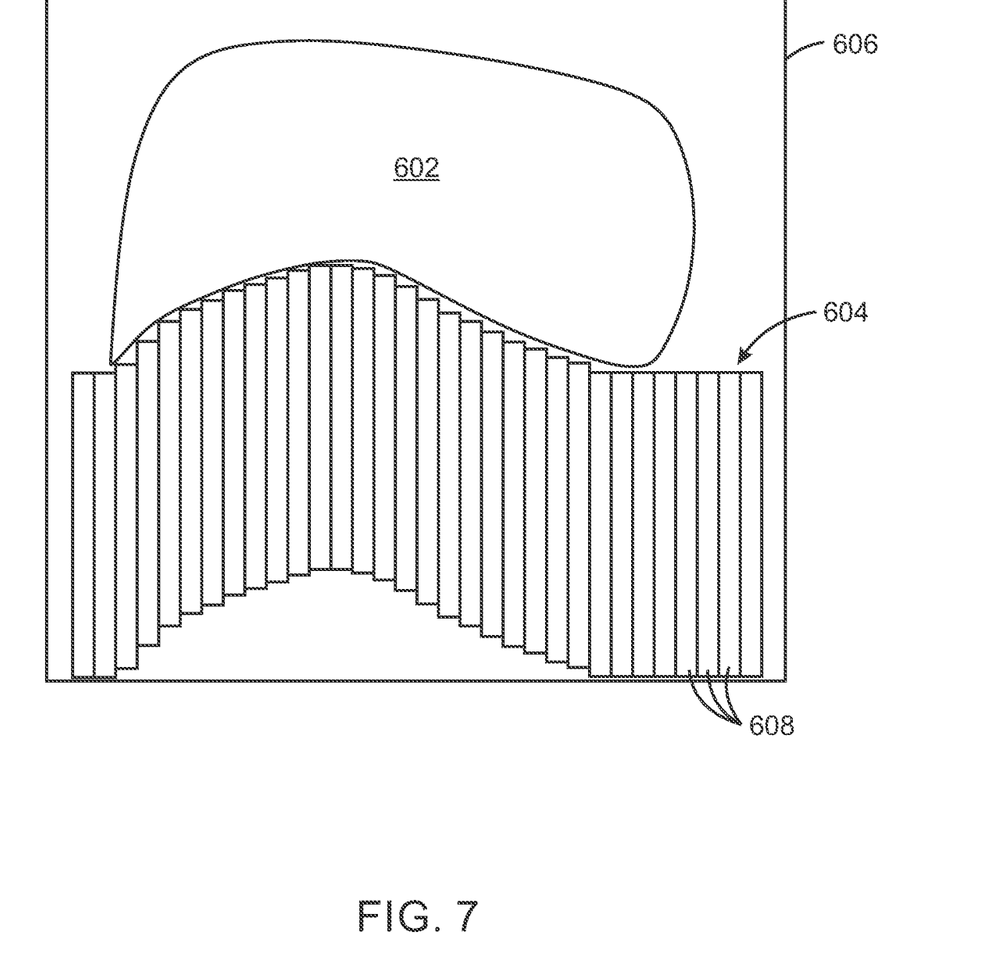
FIG. 7 is an illustration of another example technique for supporting a green part during sintering, according to some examples.

FIG. 7 is an illustration of another example technique for supporting a green part during sintering. FIG. 7 shows the green part 602 supported by a pin array 604 inside of the sintering furnace 606. The pin array 604 may be the same as the pin array 100 shown in FIG. 1 or the pin array 200 shown in FIG. 2. The pin array 604 may also include a frame (not shown) that allows the pins to be locked in place. The pins 608 may be set so that the support surface of the pin array 604 conforms to the initial contour of the green part 602 or the contour of final state of the green part 602 after it has been sintered.

In this example, the pins 608 of the pin array 604 are set and then locked in place. The pins 608 may be set by placing the pin array 604 over a support structure similar to the support structure 608 shown in FIG. 6. However, unlike the technique described in FIG. 6, the pins 608 can be locked in place and the support structure may then be removed before sintering. Accordingly, the support structure may be made of cheaper materials that are easier to form, such as plastic, wood, and others.

Figure 8:
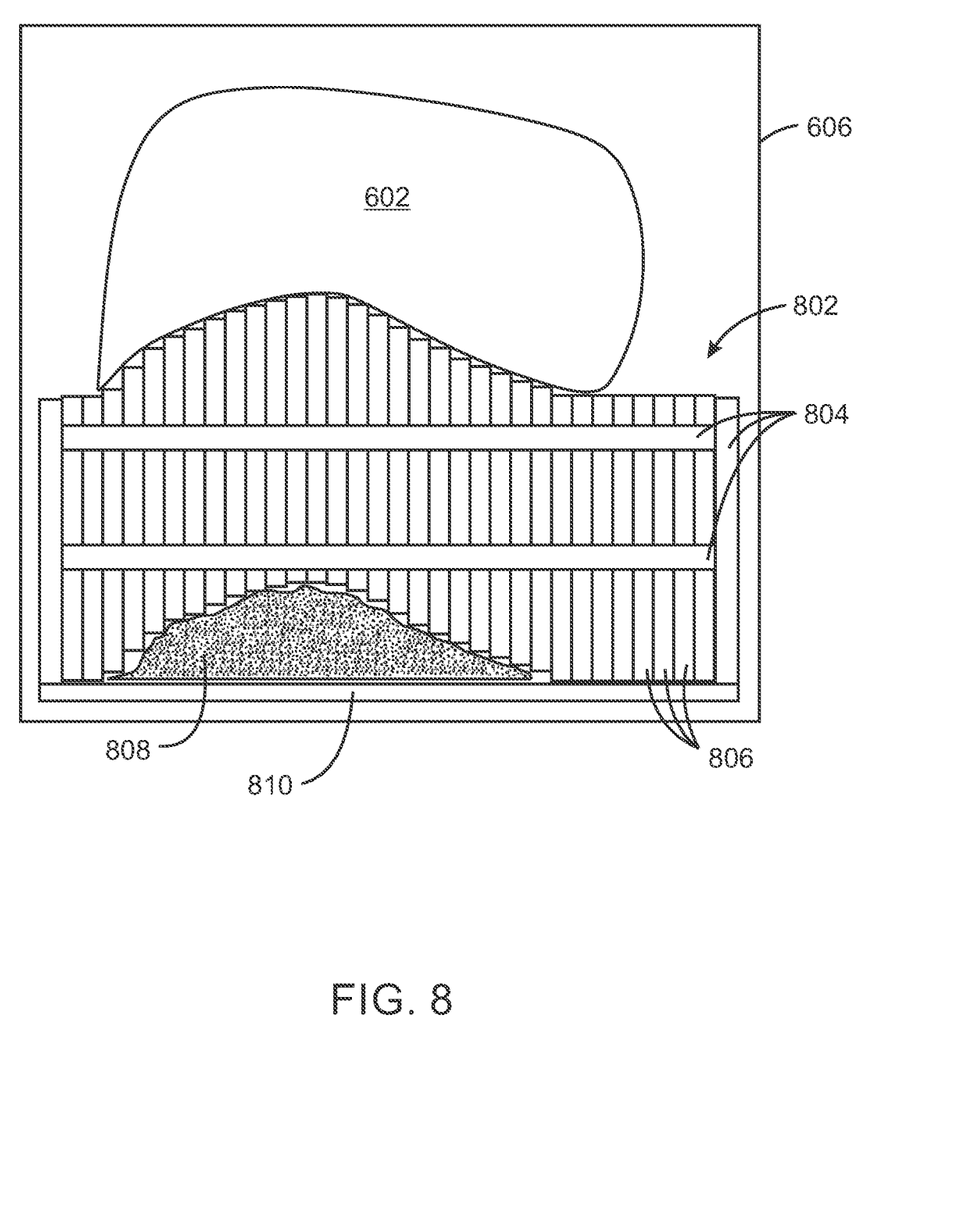
FIG. 8 is an illustration of another example technique for supporting a green part during sintering, according to some examples.

FIG. 8 is an illustration of another example technique for supporting a green part during sintering. FIG. 8 shows a green part 602 supported by a pin array 802 inside of the sintering furnace 606. The pin array 802 may be similar to the pin array 100 shown in FIG. 1 or the pin array 200 shown in FIG. 2, and includes a frame 804 that allows the pins 806 to move freely. The pins 806 may be adjacent to one another and touching as in the pin array 100, or the pins 806 may be supported within a plurality of support holes as in the pin array 200.

In this example, the pins 806 of the pin array 802 are held in place by a thermally reactive support material 808. The support material 810 may be held in place by a removable plate 810 coupled to the bottom of the frame 804. For example, prior to placing the pin array into the sintering furnaces, the pin 806 of the pin array may be adjusted to the desired contour and locked in place. With the pin array inverted, the support material may then be added over the bottom surface of the pins 806. With the support material in place, the plate may be coupled to the bottom surface of the pin array, the pin array turned right side up, and the pins unlocked.

In its initial configuration, i.e., prior to sintering, the support material 808 supports the pins 806 so that the contour of the support surface of the pin array 802 will conform to the initial contour of the green part 602. During the sintering process, the support material 808 will be exposed to heat, and will react by shrinking at a desired rate. As a result, the pins 806 will retract during the sintering process to adjust the shape of the support surface of the pin array 802. In this way, the support surface of the pin array 802 can adjust to the changing shape of the green part 602 as it shrinks during sintering. At the end of the sintering process, the support surface of the pin array 802 may conform to the contour of final state of the green part 602 after it has been sintered.

The thermally responsive support material 808 may be a metal or ceramic powder that sinters when exposed to the heat inside the furnace during sintering. In some examples, the thermally responsive support material 808 is a ceramic paste formed by mixing ceramic powder with a filler that can be uniformly distributed among the ceramic particles and that is capable of being burned out in the sintering oven. The filler may be any solid or liquid organic with high boiling point, including glycols and others. Suitable fillers include polyvinyl alcohol (PVA), polyvinylpyrrolidone (PVP), polysaccharides, and many others. During the sintering process, the filler will burn off, causing the support material 801 to shrink more than if ceramic powder is used alone. The degree of shrinking may be controlled by controlling the amount of filler in the ceramic paste. To prevent the intrusion of the support material 808 between the pins, a sheet of ceramic paper may be disposed between the support material and the pins 806 and/or each pin 806 may be shaped to reduce the gaps between the heads of the pins 806 as shown in FIG. 9.

Figure 9:
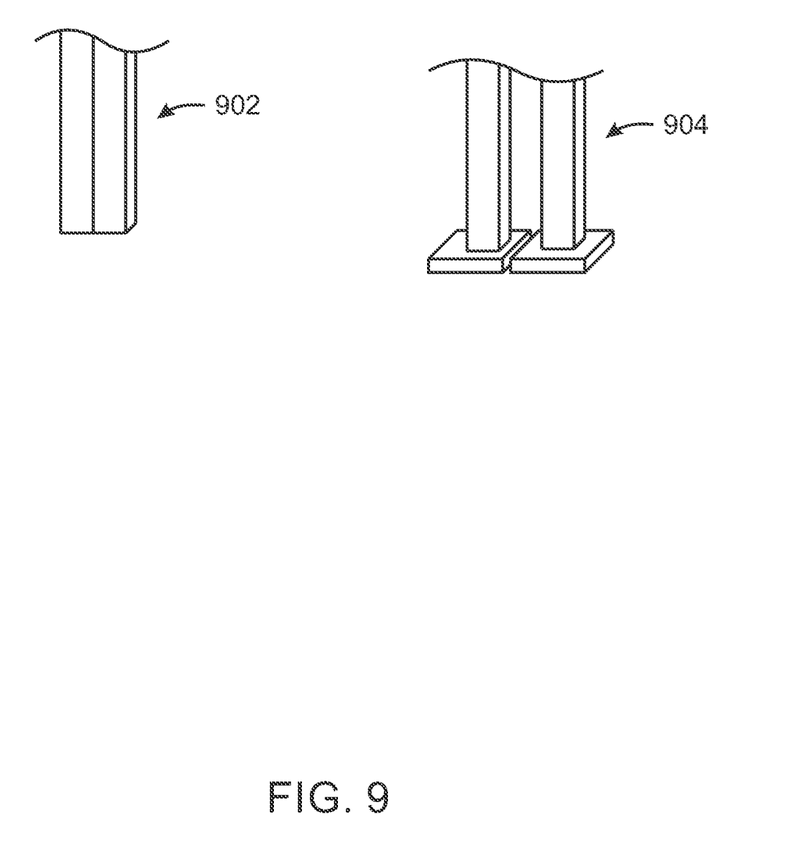
FIG. 9 is an illustration of various pin shapes that may be used in the pin arrays, according to some examples.

FIG. 9 is an illustration of various pin shapes that may be used in the pin arrays 100 and 200. The pin shapes shown in FIG. 9 may be useful in the process illustrated in FIG. 8 to prevent intrusion of the support material between the pins. The pins 902 have a continuous square cross section and flat bottom surface, enabling the pins to lay flat against one another. The pin 902 may be used in a pin array that uses closely packed pins, such as the pin array 100 of FIG. 1. The pins 904 have a square cross section and a square foot with a wider surface area compared to the body of the pin. The wider feet of pins 904 reduce the size of the gaps between the pins at the feet. The pins 904 may be used in the pin array 200 of FIG. 2, which does not allow for closely packed pins. It will be appreciated that various other pin foot types may also be possible, and that the pins shown in FIG. 9 are a small sample of the various types of pin foot types that may be used in accordance with the present techniques.

Figure 10:
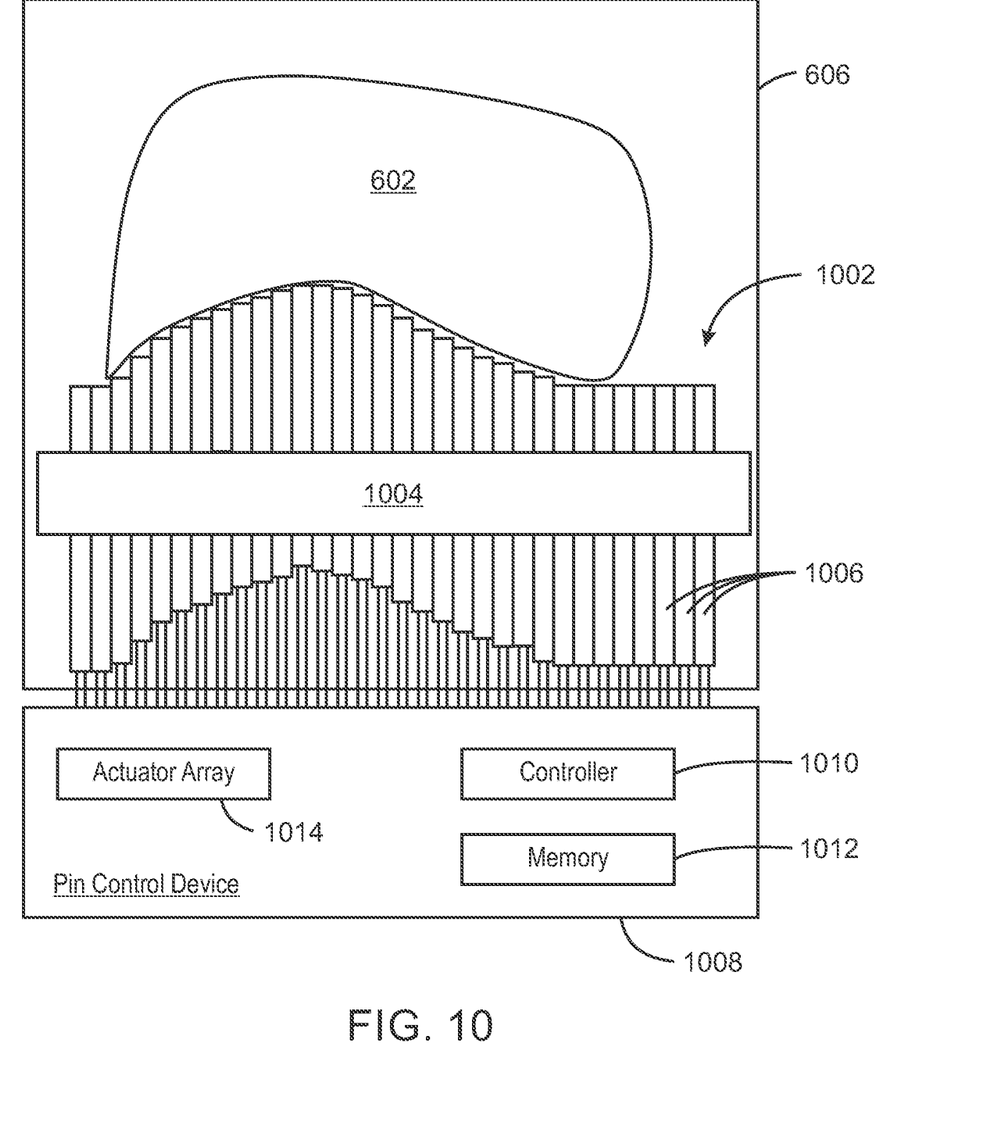
FIG. 10 is an illustration of another example technique for supporting a green part during sintering, according to some examples.

FIG. 10 is an illustration of another example technique for supporting a green part during sintering. FIG. 10 shows a green part 602 supported by a pin array 1002 inside of the sintering furnace 606. The pin array 1002 may be similar to the pin array 100 shown in FIG. 1 or the pin array 200 shown in FIG. 2, and includes a frame 1004 that allows the pins 1006 to move freely. The pins 1006 may be adjacent to one another and touching as in the pin array 100, or the pins 1006 may be supported within a plurality of support holes as in the pin array 200.

In this example, the pins 1006 of the pin array 1002 are supported by an electronic pin control device 1008 that can be configured to provide active control of the support surface of the pin array 1002 through the sintering process. The pin control device 1008 may include a controller 1010, memory 1012, and an actuator array 1014. The actuator array 1014 can include a separate actuator independently coupled to each one of the pins 1006. In some examples, the actuator array 1014 may be an array of stepper motors.

The controller 1010 is configured to operate the actuator array 1014 to move the pins 1006 to create a support surface for the green part. The controller 1010 can be any type of processor, including a single core processor, a multicore processor, a microcontroller, application specific integrated circuit (ASIC), programmable logic controller (PLU), a field programmable gate array (FPGA), or any combination thereof. The controller 1010 can be communicatively coupled to a memory 1012. The memory 1012 may include volatile memory such as Random Access Memory (RAM), which may be a working memory used by the controller 1010 to process instructions in accordance with the programming of the primary appliance. The memory 1012 may include non-volatile memory such as solid state memory, disk drives, or flash drives, for persistent storage of data such as user files, application software, drivers, and the like.

In an initial configuration, i.e., prior to sintering, the pin control device 1008 supports the pins 1006 so that the contour of the support surface of the pin array 1002 will conform to the initial contour of the green part 602. During the sintering process, the pin control device 1008 adjusts the pins 1006 to actively adjust the shape of the support surface of the pin array 1002 during the sintering process. The adjustment of the pins 1006 may involve extending or retracting individual pins 1006 based on the expectations about how the shape of the green part 602 will change throughout the sintering process. These adjustments may be based on a model of how the green part 602 will change shape throughout the sintering process. The model may be generated based on experimental data or computer simulations, for example, and may be loaded into the memory 1012 of the pin control device 1008. At the end of the sintering process, the support surface of the pin array 1002 will conform to the contour of final state of the green part 602 after it has been sintered.

Figure 11:
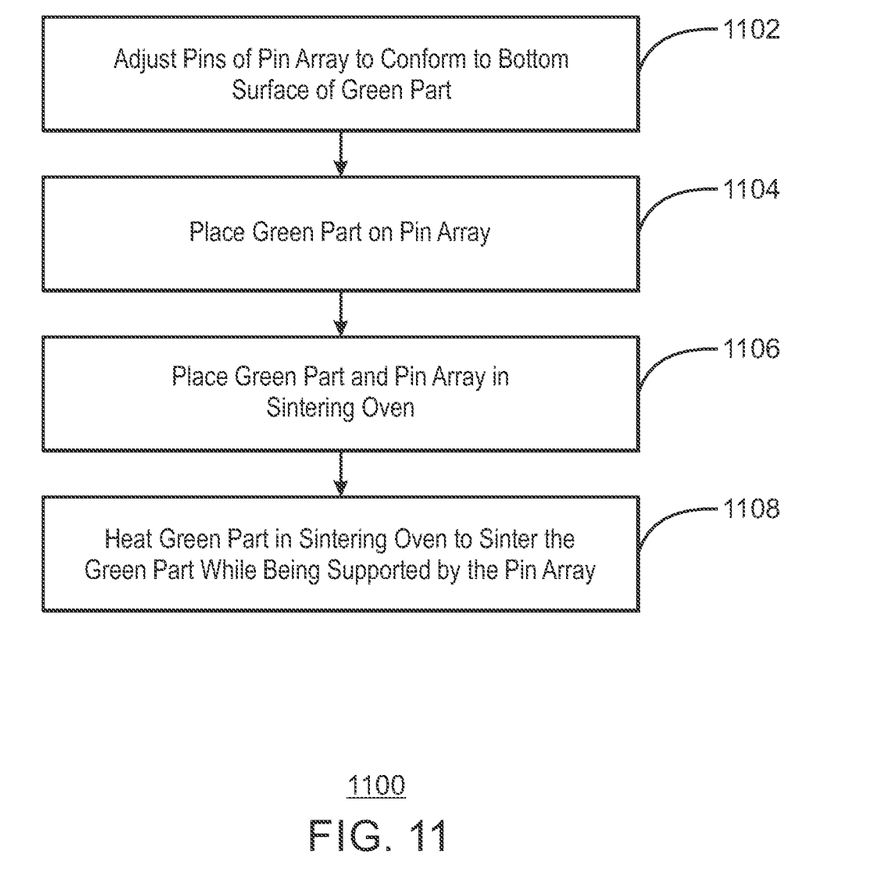
FIG. 11 is a process flow diagram summarizing a method of sintering a green part such as a 3D printed object, according to some examples.

FIG. 11 is a process flow diagram summarizing a method of sintering a green part such as a 3D printed object. The method 1100 may be performed using any of the pin arrays show and described above. The process may begin at block 1102.

At block 1102, the pins of a pin array are adjusted to provide support for a bottom surface of the green part. The adjustment of the pins may cause the pins will conform to the initial state of the green part prior to sintering or the final shape of the green part after sintering. For example, adjusting the pins of the pin array may include disposing the pin array over a complimentary support piece under the pin array and locking the pins in place. Adjusting the pins of the pin array can also include activating an array of stepper motors to extend or retract at least some of the pins. Additionally, the pins may also be adjusted continuously throughout the sintering process in accordance with the techniques described above. For example, a thermally responsive support material may be disposed below the pin array, so that the thermally responsive support material will shrink during sintering to cause at least some of the pins to retract during sintering.

At block 1104, the green part is placed on the pin array. In some examples, placing the green part on the pin array also serves to adjust the pins of the pin array. For examples, the pins of the pin array may be supported by springs, which allow the pin to be depressed by the weight of the green part. In some examples, a barrier layer may be disposed over the pin array between the pin array and the 3D printed object.

At block 1106, the green part and pin array are placed in a sintering oven, and the green part is heated to sinter the green part while being supported by the pin array. The sintering process may include raising the temperature of the sintering oven and holding the temperature at the desired level for a specified period of time suitable for sintering the object. In some examples, the sintering process may be carried out over multiple stages wherein the temperature is varied and held through multiple stages to enable a specific reaction to take place, such as elimination of binding agents, and the like. The temperatures, time periods, number of stages, and the like may be determined based on the composition of the green part.

It is to be understood that the block diagram of FIG. 11 is not intended to indicate that the method 1100 is to include all of the actions shown in FIG. 11. Rather, the method 1100 can include fewer or additional components not illustrated in FIG. 11.

While the foregoing examples are illustrative of the principles of one or more particular applications, it will be apparent to those of ordinary skill in the art that numerous modifications in form, usage, and details of implementation can be made without the exercise of inventive faculty, and without departing from the principles and concepts described herein. It is intended that the appended claims cover all such modifications and variations as fall within the true spirit and scope of the disclosure.

We claim:

1. An apparatus for supporting a 3D printed object during sintering, comprising:
   a pin array support frame comprising a plurality of apertures;
   an array of pins disposed in the plurality of apertures; and
   a pin adjustment device coupled to at least some of the pins in the array of pins, wherein the pin adjustment device comprises a plate disposed at a bottom of the pin array support frame to enclose a thermally responsive support material between the plate and a bottom surface of the array of pins, wherein the thermally responsive support material shrinks during sintering to cause the array of pins to retract array in response to the sintering.

2. The apparatus of claim 1, wherein the pin adjustment device comprises an actuator that enables the array of pins to be extended or retracted prior to sintering.

3. The apparatus of claim 1, wherein the pin adjustment device comprises a spring that enables the array of pins to rise or fall in response to weight shifts caused by the 3D printed objected shrinking during sintering.

4. The apparatus of claim 1, wherein a shape of a head of at least some of the pins in the array of pins is pointed to reduce adhesion of the array of pins to the 3D printed object during sintering.

5. The apparatus of claim 1, wherein a shape of a head of at least some of the pins in the pin array is rounded to reduce friction between the array of pins and the 3D printed object during sintering.

6. The apparatus of claim 1, wherein the thermally responsive support material comprises a ceramic powder mixed with a filter that burns out as the thermally responsive support material is heated during sintering.

7. The apparatus of claim 1, wherein a shape of a head of at least some of the pins in the array of pins is pointed to reduce adhesion of the array of pins to the 3D printed object during sintering.

8. The apparatus of claim 1, wherein the pin adjustment device comprised a stepper motor to extend or retract at least one of the pins of the array of pins.

9. The apparatus of claim 1, wherein at least some of the pins in the array of pins have a bottom portion with a square cross section.

10. The apparatus of claim 1, wherein the array of pins and the pin array support frame are ceramic.

11. The apparatus of claim 1, wherein the thermally responsive support material is a ceramic paste.

12. The apparatus of claim 1, wherein a shape of a head of at least some of the pins in the pin array is rounded to reduce friction between the pin array and the 3D printed object during sintering.

13. The apparatus of claim 1, wherein a shape of a foot of at least some of the pins in the pin array is square to prevent intrusion of the thermally responsive support material between the pins.

* * * * *